(12) United States Patent
Braun (10) Patent No.: US 6,398,318 B1
(45) Date of Patent: *Jun. 4, 2002

(54) METHOD AND DEVICE FOR MONITORING A BRAKING SYSTEM CONTAINED IN A VEHICLE

(75) Inventor: Thomas Braun, Murr (DE)

(73) Assignee: Robert Bosch GmGH, Stuttgart (DE)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/240,289

(22) Filed: Jan. 29, 1999

(30) Foreign Application Priority Data

Jan. 29, 1998 (DE) ......................... 198 03 365
Jun. 25, 1998 (DE) ......................... 198 27 943

(51) Int. Cl.$^7$ ............................ B60T 8/88
(52) U.S. Cl. ............. 303/122.03; 303/122.08; 303/122.09
(58) Field of Search .............. 303/122, 122.01, 303/122.02, 122.03, 122.04, 122.06, 122.07, 122.09, 122.08, 113.1, 113.2, 140, 145, 167, 166, 173; 73/121, 129; 701/82, 92

(56) References Cited

U.S. PATENT DOCUMENTS

| | | | |
|---|---|---|---|
| 3,861,760 A | * 1/1975 | Hamelin | 303/122.05 |
| 4,013,324 A | * 3/1977 | Quon | 303/122.06 |
| 4,219,244 A | * 8/1980 | Griner | 303/122.06 |
| 4,728,156 A | 3/1988 | Burdorf et al. | |
| 4,824,182 A | * 4/1989 | Steffes et al. | 303/122.08 |
| 4,841,446 A | * 6/1989 | Leiber et al. | 303/122.01 |
| 5,066,073 A | * 11/1991 | Frigger et al. | 303/122.09 |
| 5,312,169 A | * 5/1994 | Buschmann | 303/140 |
| 5,506,776 A | 4/1996 | Fushimi et al. | |
| 5,779,328 A | * 7/1998 | Mergenthaler et al. | 303/116.1 |
| 5,780,732 A | * 7/1998 | Giesler et al. | 73/121 |
| 5,782,541 A | 7/1998 | Schappler | |
| 5,927,824 A | * 7/1999 | Pahl et al. | 303/113.2 |

FOREIGN PATENT DOCUMENTS

| | | | | |
|---|---|---|---|---|
| DE | 34 18 042 | 11/1985 | | |
| DE | 34 18 044 | 4/1986 | | |
| DE | 38 28 931 | 3/1990 | | |
| DE | 39 22 947 | 1/1991 | | |
| DE | 41 18 597 | 12/1991 | | |
| DE | 41 06 336 | 9/1992 | | |
| DE | 195 08 501 | 9/1995 | | |
| DE | 44 28 929 | 2/1996 | | |
| DE | 196 38 196 | 7/1997 | | |
| DE | 196 39 560 | 4/1998 | | |
| EP | 0 733 531 | 2/1996 | | |
| JP | 63-170160 A | * 7/1988 | | 303/122.08 |
| WO | WO 91/15386 | 10/1991 | | |
| WO | 97/21570 | 6/1997 | | |

* cited by examiner

Primary Examiner—Paul N. Dickson
Assistant Examiner—Thomas J. Williams
(74) Attorney, Agent, or Firm—Kenyon & Kenyon (57) ABSTRACT

A method for monitoring a braking system contained in a vehicle. The braking system includes at least one brake circuit. The brake circuit, on the output side, contains valve configurations, to which wheel brake cylinders allocated to the brake circuit are connected. The braking system furthermore has at least one pump capable of delivering braking medium to at least two wheel brake cylinders. During predetermined vehicle states, the at least one pump is actuated and the first valve configurations are driven by predefined driving signals. Ascertained for at least one wheel of the vehicle during the actuation of the pump and the first valve configurations is a wheel-performance variable which describes the wheel performance, in particular the wheel-rotation performance, of the corresponding wheel. The braking system is checked for a first and/or second fault as a function of this wheel-performance variable.

25 Claims, 4 Drawing Sheets

METHOD AND DEVICE FOR MONITORING A BRAKING SYSTEM CONTAINED IN A VEHICLE

BACKGROUND INFORMATION

International Patent Publication No. WO 97/21570 describes a conventional braking system. This conventional braking system has a master brake cylinder, to which wheel brake cylinders are connected via wheel-brake pressure-modulation valve arrangements having a brake-pressure build-up valve and a brake-pressure reducing valve. Brake fluid released from the wheel brake cylinders through the brake-pressure reducing valves can be delivered by a return pump back in the direction of the master brake cylinder, or in the direction of the wheel brake cylinders again for renewed pressure build-up. A precharging pump is used to feed brake fluid from a reservoir to the return pump when the master brake cylinder is not actuated. Given appropriate switching of valves in the known vehicle braking system, brake pressure can be built up in the vehicle braking system both by the return pump and by the precharging pump. Furthermore, for slip control, this vehicle braking system has wheel-rotation sensors, as well as an electronic controller which evaluates signals from the wheel rotation sensors and controls the pumps and valves of the vehicle braking system. This conventional vehicle braking system has a brake-slip control, traction-control, and an operating-dynamics control device.

Methods and devices for monitoring a braking system contained in a vehicle are known. For example, German Patent Application No. 38 28 931 describes a method for monitoring the functioning of a braking system. To do so, the travel, the speed and the acceleration of the master-cylinder piston are detected by a sensor. The brake-actuation data thus detected are routed to the electronic controller. The wheel data, i.e. the wheel circumferential velocity, is detected by a wheel sensor and routed to the controller. The electronic controller checks whether the wheel data correlate to the brake-actuation data which correspond to a proper braking. If this is not the case, a pump is operated by closing a switch, the pump delivering pressurized media into the wheel brake cylinder which could not be supplied with pressurized media before because of the malfunction. However, because of its design, in this method it is only possible to monitor the braking system when it is actuated by the driver. It is not possible to monitor the braking system independently of the driver, i.e. at arbitrary points of time.

German Patent Application No. 41 18 597 describes a device for detecting and eliminating a storage-fluid leakage. The hydraulic system in which this device is incorporated includes a storage reservoir, an actuator that is actuated by fluid fed from the storage, and a control valve having an open position and closed position, respectively, for a fluid connection or a fluid shut-off between the storage and the actuator. In addition, the device includes a leakage sensor which generates an output signal indicative of a leakage flow of the fluid from the storage through the control valve in the closed position. This output signal is fed to a device, which is capable of moving the valve element of the control valve back and forth in response to the presence of the output signal. Due to the back and forth movement of the valve element, it is brought into the correct seating on the valve seat, thus ensuring a complete closure of the control valve. The fluid leakages can come about because of foreign bodies present between the valve seat and the valve element. The disadvantage of the device described above is that, besides evaluating the pump performance, in addition a pressure-operated switch is necessary for detecting the leakage.

German Patent Application No. 39 22 947 describes a hydraulic braking system which contains brake-pressure modulators that make it possible to prevent the vehicle wheels from locking as a result of brake pressures which are too high. The brake-pressure modulators include brake-line lock valves and cylinders having pistons, in response to whose displacement, pressurized media escapes from the wheel brakes to reduce the brake pressure. The piston displacements are controlled via valve configurations which are connected to a servo pressure source. Failure of the servo pressure source, if there is even a small leak of a valve arrangement, can lead to at least partial loss of braking force during a braking operation. To detect and indicate possibly existing leakiness, a control unit, acting on the valve arrangements, is adjusted, such that it controls the valve arrangements into different positions, and at the same time, observes via a pressure sensor whether logically assigned pressures are changing unacceptably. This conventional braking system also has the disadvantage that pressure sensors are necessary to implement the monitoring. It may be that it is possible to monitor the braking system independently of the driver, however the braking medium necessary for this is made available starting from a storage reservoir. Because of this, a constant pressure of the braking medium is not absolutely ensured, which can possibly lead to an impairment of the implemented monitoring.

Thus, one of the objects of the present invention is to improve conventional methods and devices, respectively, for checking or monitoring a braking system, so that, first, by using sensors (e.g., wheel r.p.m. sensors), which are present in a braking system equipped with a slip-control device, no additional sensors (e.g., pressure sensors) are necessary. Second, it is possible to monitor the braking system independently of an actuation of the braking system by the driver. At the same time, in performing the above, uniform conditions should exist (e.g., uniform pressure ratios).

SUMMARY OF THE INVENTION

A braking system according to the present invention contains at least one brake circuit. This brake circuit includes first valve configurations on the output side, each composed of a first valve, in particular an intake valve, and a second valve, in particular a discharge valve. Wheel brake cylinders allocated to the brake circuit are connected to the first valve configurations. The braking system furthermore contains a reservoir for accommodating braking medium and, on the incoming side, includes a first valve, in particular a switch-over valve, and a second valve, in particular a suction valve, the reservoir being connected to these two valves. In addition, the braking system has at least one pump which is capable of delivering braking medium to at least two wheel brake cylinders. The braking system according to the present invention has a first pump, in particular a precharging pump, which on the intake side, is directly connected to the reservoir, and which is capable of delivering braking medium in the direction of the wheel brake cylinders, and a second pump per brake circuit, in particular a return pump, which is connected to the first valve configurations in the brake circuit, and which is capable of delivering braking medium into or out of the wheel brake cylinders.

According to a method of the present invention, the at least one pump is actuated, and the first valve configurations are driven by pre-determined driving signals during predetermined vehicle states. During the actuation of the pump and the first valve configurations, a wheel-performance variable is ascertained for at least one wheel of the vehicle, the wheel-performance variable describing the wheel performance, in particular the wheel-rotation performance, of the corresponding wheel. The braking system is checked for a first and/or second fault as a function of this wheel-performance variable.

The wheel slippage and/or wheel r.p.m. and/or wheel velocity is utilized as the wheel-performance variable. One of the advantages of using the above-specified variables is that they can be ascertained using the wheel r.p.m. sensors which are at hand anyway in a braking system equipped with a slip-control (e.g., traction-control) system. Therefore, no additional sensors such as pressure sensors are necessary. Moreover, modification of the braking system, as far as the hydraulic components are concerned, is not necessary, i.e., no additional pumps or valves or other hydraulic aids are necessary to implement the method according to the present invention. In other words, it is possible to fall back on the actuators and sensors, respectively, contained in the vehicle.

Another advantage of the method according to the present invention is that a first fault and/or a second fault of the braking system is able to be ascertained using this method, i.e., selectively different individual faults or a combination of different individual faults are detectable.

Since the braking system is monitored as a function of a wheel-performance variable, the method according to the present invention therefore advantageously proceeds during predetermined vehicle states. This ensures that the wheel-performance variable, and with this variable the monitoring or checking of the braking system as well, is not invalidated by the vehicle performance. For example, the wheel-performance variable could be invalidated in response to cornering, or during an acceleration or braking process. To avoid this, the predetermined vehicle states are can be defined as follows: A predetermined vehicle state exists when the vehicle is traveling approximately straight ahead (e.g., in a straight line), and a variable describing the vehicle velocity is nearly constant, i.e., the vehicle is being neither braked nor accelerated, and the master brake cylinder is not actuated. Actuation of the master brake cylinder can be ascertained, e.g. with the aid of a brake lights switch. Such vehicle states can be brought about either intentionally, or can arise during the operation of the vehicle, i.e., during normal vehicle operation. As an example, the control at the rear end of the assembly line at the vehicle manufacturer, during which the vehicle is either moved by a driver according to defined stipulations or the vehicle is on a roller dynamometer, or a test drive after being in a service garage, could be named as intentionally caused vehicle states.

When monitoring the braking system for the first fault, a check is made as to whether or not the intake valves contained in the braking system are defective. Using this check test, the intention is to ascertain whether one of the intake valves is defectively open, i.e. whether braking medium is flowing through the intake valve, although, on the basis of its driving, it is in the blocking position. A wheel-slippage variable, which describes the wheel slippage existing at the corresponding wheel, is used as the wheel-performance variable during this check test.

All the intake valves can be brought by the predefined driving signals into a blocking position during this check test. During this driving of the intake valves, braking medium is conveyed toward the intake valves by actuating the pump. If the intake valves are in perfect condition, i.e. if in the blocking position, they in each case completely close off the associated wheel brake cylinder, then the brake pressure in the respective associated wheel brake cylinder cannot increase. On the other hand, if the intake valves do not completely close, then the brake pressure in the respective associated wheel brake cylinder will increase, which leads to a change in the associated wheel-performance variable. To better be able to ascertain the increase in brake pressure because of a defective intake valve, all the second valves of the first valve configurations, e.g., all discharge valves, can be also brought by the predefined driving signals into a blocking position. This ensures that the braking medium, which has flowed into the wheel brake cylinder, does not immediately flow out of the wheel brake cylinder again.

The check test for the first fault can be performed as follows: During the appropriate driving of the first and second valves of the first valve configurations, a wheel-performance variable is ascertained for each wheel. These wheel-performance variables are compared to a threshold value. If all the wheel-performance variables are less than the threshold value, which is synonymous with the brake pressure not having risen in the wheel brake cylinders, and the intake valves therefore being impervious, then the first fault is not present. In the event that at least one of the wheel-performance variables is greater than the threshold value, which is an indication that the first fault seems to be present, the driving of the pump and of the first and second valves is stopped.

After a predefined period of time, the pump, and the first and second valves are again driven by the predefined driving signals. The first fault exists when, in response to this repeated driving, at least one of the wheel-performance variables is once more greater than the threshold value. Therefore, to check for the first fault, the pump, and the first and second valves are driven twice, staggered over time, in order to make this check test more reliable, e.g., more rigid. The intention is for the fault to exist only when the threshold value is exceeded two times, staggered over time. It is possible to completely dispense with the second driving of the above-specified components, and that the check test for the first fault can be carried out merely with the aid of one driving. However, given this procedure, the fault check is no longer quite so rigid.

The check test for the first fault can be performed automatically from time to time during the vehicle operation, e.g., once per ignition cycle or once per operating hour, since such a fault in the intake valves can definitely occur during the operation of a vehicle due to the deposit of a dirt particle.

When monitoring the braking system for the second fault, a check is made as to whether a fault is present in the hydraulic connection of the wheel brake cylinders to the braking system, more exactly stated, to the hydraulic modulator 12, thus, in particular, wheel brake cylinders incorrectly connected (i.e., connected to an incorrect location), or whether a fault exists in the electrical connection of the wheel r.p.m. sensors to the controller, thus incorrectly connected or non-connected wheel r.p.m. sensors. The check test is preferably conducted as a test cycle. For example, the test is performed after completion of the vehicle at the manufacturer at the end of the assembly line, or after being in a service garage, since an above-described fault can occur in both cases. A wheel-velocity variable which describes the wheel r.p.m. or the velocity of the corresponding wheel is used as the wheel-performance variable during this check test.

Since the intention during this check test is to ascertain whether the wheel brake cylinders are correctly connected to the hydraulic modulator, i.e., the braking system, or whether the wheel r.p.m. sensors are correctly connected to the controller, to this end, for a first valve configuration, the predefined driving signals advantageously bring the first valve into a flow-through position and the associated second valve into a blocking position, and for the remaining first valve configurations, the first valves are brought into a blocking position, and the associated second valves are brought into a blocking position or a flow-through position. During the above-described driving of the first and second valves, braking medium is conveyed in the direction of the wheel brake cylinders by actuating the pump. Due to the above-described driving, one wheel brake cylinder is acted upon by the brake pressure built up by the pump, however the brake pressure does not act on the remaining wheel brake cylinders. Preferably, the discharge valves of these remaining wheel brake cylinders are open, to ensure that the brake pressure does not act on these wheel brake cylinders. The one wheel brake cylinder is acted upon by a brake pressure which is sufficient to bring about a noticeable change in the wheel-performance variable of the corresponding vehicle wheel, i.e., the r.p.m. or velocity of this vehicle wheel decreases significantly. No build-up in brake pressure can take place in the case of the remaining wheel brake cylinders, and thus no change can occur in the wheel-performance variable either.

The check test for the second fault can be performed as follows: During the appropriate driving of the first and second valves, a wheel-performance variable is ascertained for each wheel. The wheel-performance variable of the wheel whose first valve is brought into the flow-through position is compared to the wheel-performance variable of at least one wheel whose first valve is brought into the blocking position. In other words, the wheel-performance variable of the braked wheel is compared to an unbraked wheel. The second fault is present when the wheel-performance variable of the braked wheel does not differ to a specifiable degree from the wheel-performance variable of the at least one wheel. Thus, the wheel whose intake valve should actually be in the flowthrough position is not being acted upon by the braking medium, and thus is evidently not properly connected to the hydraulic modulator. Alternatively or additionally, the check test for the second fault can be performed as follows: For the wheel whose first valve is brought into the flow-through position, the change in the wheel-performance variable is ascertained per unit of time and compared to a predefined threshold value. The second fault exists when this change is less than the predefined threshold value.

The evaluation of the change in the wheel-performance variable has an advantage compared to the comparison of the wheel-performance variable of the braked wheel to that of the one unbraked wheel, since this evaluation can be made independently of the other wheels, thus ruling out possible error sources.

The check test for the second fault can also be performed in such a way that, in each case, the associated first valve is brought appropriately into the flow-through position for a different wheel, one after the other. In other words, the check test for the second fault is performed so that, due to the cyclical driving of the first valve configurations, the brake pressure can act upon each vehicle wheel one time during a test cycle. In so doing, sufficient time is provided in each case after the cyclical driving, so that the brake pressure of the respective wheel acted upon with pressure can again normalize.

In the event of an incorrect hydraulic connection of two or more wheel brake cylinders, or an incorrect electrical connection of two or more wheel r.p.m. sensors, the method according to the present invention permits the ascertainment of the braking of a vehicle wheel which should actually not be braked, thus making it possible to determine a connection fault.

During the actuation of the pump and of the first valve configurations, the first valve on the intake side is advantageously brought into a blocking position, and the second valve on the intake side is brought into a flow-through position. This ensures that braking medium is delivered to the wheel brake cylinders.

The method according to the present. invention can be implemented on single-circuit braking systems, just as on multiple-circuit braking systems. This method can also be implemented for hydraulic and for pneumatic braking systems. Furthermore, the method according to the present invention can be implemented for electrohydraulic or electropneumatic braking systems, in which the brake pressure is not built up by a master brake cylinder, but by a pump or by a compressor, and is controlled as a function of a brake-force signal caused by a brake pedal. The method according to the present invention can also be implemented in the case of multiple-circuit braking systems having a precharging pump for each brake circuit.

It is also possible to combine the check test for the first fault with that for the second fault. Thus, for example, the check test for the first fault can be employed within the framework of the check test for the second fault. In this manner, it is possible to rule out the recognition of a false connection of a wheel brake cylinder to the hydraulic modulator, or a false connection of a wheel-speed sensor to the controller, although an intake valve is actually defective. The above-described check tests of the braking system can also be advantageously integrated into other check test sequences.

The wheel-performance variable employed during the check test for the second fault can be used as the wheel-performance variable during the check test for the first fault. The equivalent holds true in reverse manner as well.

DETAILED DESCRIPTION

Figure 1:
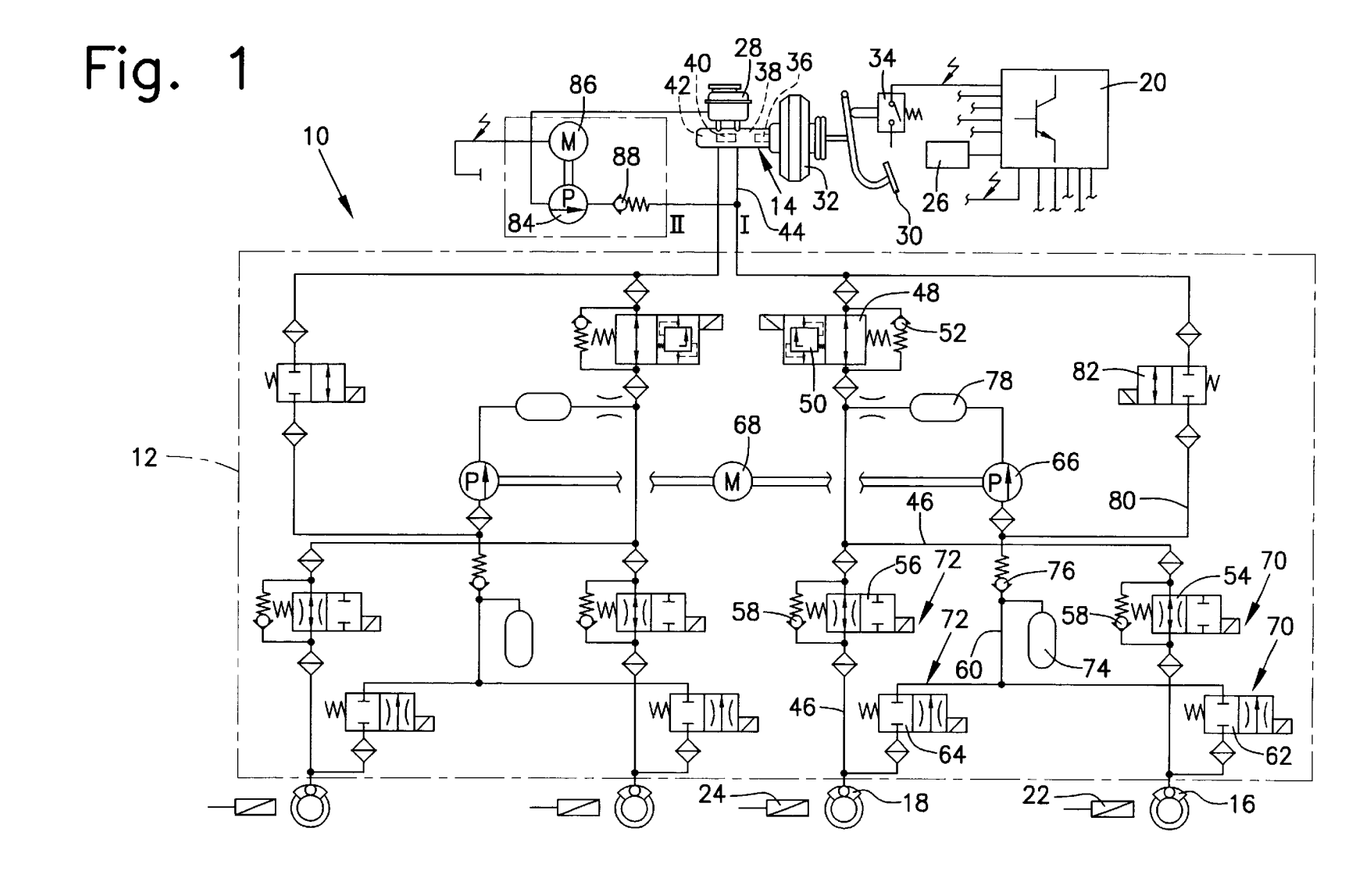
FIG. 1 shows an exemplary hydraulic circuit diagram of a vehicle braking system which is monitored or checked using a method according to the present invention, and a controller of the vehicle braking system.

A hydraulic braking system 10 according to the present invention, shown in FIG. 1, is designed as a dual-circuit braking system and has a slip-control device. Hydraulic components of the slip-control device such as solenoid valves, pumps, pressure accumulator and damper chambers are accommodated in a hydraulic modulator 12. Hydraulic modulator 12 is connected to a dual-circuit master brake cylinder 14. Wheel brake cylinders 16, 18 are connected to hydraulic modulator 12. For the slip control, vehicle braking system 10 has a controller 20 which receives signals from wheel r.p.m. sensors 22, 24 that are allocated to vehicle wheels able to be braked by wheel brake cylinders 16, 18. The slip-control device, which functions in a conventional manner and shall not be described in detail below, makes possible a brake-slip control (ABS) (i.e., antilock braking system), and/or a traction control (ASR) (i.e., anti-slip regulation) and/or an operating-dynamics control (FDR). With regard to the functioning of vehicle braking system 10 in the case of conventional braking without locking danger, and with regard to the antilock braking control, the traction control and the operating-dynamics control is described in International Patent Publication No. WO 97/21570, in the German Patent Application No. 196 39 560, or in the publication "FDR—Die Fahrdynamikregelung von Bosch" (FDR—The Operating-Dynamics Control System of Bosch) published in the Automobiltechnischen Zeitschrift (ATZ) (Auto Technology Periodical) 96, 1994, issue 11, pages 674–689. For the operating-dynamics control, vehicle braking system 10 has further sensors 26 which are connected to electronic controller 20. For example, these sensors 26 detect a steering angle, a yaw rate, and transversal acceleration of the vehicle, as well as a master brake cylinder pressure. If a brake-slip control and/or traction control is implemented with the vehicle braking system, only the wheel r.p.m. sensors are necessary as sensors for this purpose.

Master brake cylinder 14 has a reservoir 28 for brake fluid, and is actuated by a brake pedal 30 via a power brake unit (e.g., a power booster) 32. To ascertain the actuation of master brake cylinder 14, vehicle braking system 10 has a brake lights switch 34 connected to electronic controller 20.

Master brake cylinder 14 is designed, in a conventional manner, as a dual-circuit master brake cylinder. Master brake cylinder 14 has a first "rod piston" 36 which is moved directly by brake pedal 30 via power brake unit 32. In response to its displacement into master brake cylinder 14, rod piston 36 causes a build-up of brake pressure in a first pressure chamber 38 of master brake cylinder 14. In addition, master brake cylinder 14 has a second "floating piston" 40 which is acted upon by the pressure in first pressure chamber 38 and is thereby shifted in master brake cylinder 14 and, in response to its displacement into master brake cylinder 14, produces a brake pressure in a second pressure chamber 42 of master brake cylinder 14. The two pistons 36, 40 are indicated in the drawing by dotted lines. If, because of a defect, no brake pressure is built up in first pressure chamber 38 in response to the shift of rod piston 36 into master brake cylinder 14, rod piston 36, after a free travel, mechanically shifts floating piston 40 in a conventional manner, so that brake pressure is built up in second pressure chamber 42 by stepping down on brake pedal 30.

Connected to master brake cylinder 14 are two brake circuits I, II which are independent of one another and which, in the exemplary embodiment shown in FIG. 1, have two wheel brake cylinders 16, 18 each. Vehicle braking system 10 is described below with the aid of brake circuit I shown in the right side of FIG. 1. Brake circuit II shown on the left is identically composed and functions in the same manner.

Brake circuit I is connected via a main brake line 44 to a pressure chamber 38 of master brake cylinder 14. Main brake line 44 branches off into two wheel brake lines 46 which lead to wheel brake cylinders 16, 18. Disposed in main brake line 44 is a switch-over valve 48 which is open in its basic position (flow-through position), and in which is integrated a pressure regulating valve (e.g., a pressure-limiting valve) 50, opening in the direction of master brake cylinder 14, which is effective in a closed position (blocking position) of switch-over valve 48. Switch-over valve 48 represents a first valve on the incoming side. Connected in parallel to switchover valve 48 is a check valve (e.g., one-way valve) 52 which can be traversed by flow in the direction from master brake cylinder 14 to wheel brake cylinders 16, 18.

Arranged in wheel brake lines 46 are first valves 54, 56 be (e.g., intake valves) which are open in their basic position (flow-through position), and to which check valves 58, that can be traversed by flow in the direction from wheel brake cylinders 16, 18 to master brake cylinder 14, are connected in parallel.

A shared feedback line 60 leads from wheel brake cylinders 16, 18 to main brake line 44. Feedback line 60 is connected to main brake line 44 between switch-over valve 48 and the branching of main brake line 44 into wheel brake lines 46, thus between switch-over valve 48 and intake valves 54, 56. Each wheel brake cylinder 16, 18 is connected via a second valve 62, 64 (e.g., a discharge valve) to feedback line 60. Disposed in feedback line 60 is a second pump 66 (e.g., a return pump) which is capable of delivering brake fluid, flowing out of wheel brake cylinders 16, 18 through discharge valves 62, 64, into main brake line 44, thus in the direction of master brake cylinder 14, or back in the direction of wheel brake cylinders 16, 18. Return pump 66 is driven by an electromotor 68, which drives both return pumps 66 of both brake circuits I, II jointly. Intake valves 54, 56 and discharge valves 62, 64 form first valve arrangements 70, 72 allocated to each wheel brake cylinder 16, 18.

On an intake side of return pump 66, a pressure accumulator 74 is connected to feedback line 60. In feedback line 60, a check valve 76, traversable by flow in the direction of return pump 66, is arranged between pressure accumulator 74 and the intake side of return pump 66. A damper chamber 78 is disposed in feedback line 60 between a delivery side of return pump 66 and main brake line 44. An intake line 80 is connected directly to master brake cylinder 14 via main brake line 44, thus bypassing switch-over valve 48, a suction valve 82, closed in its basic position (e.g., blocking position), being arranged in intake line 80. The suction valve represents a second valve on the intake side. Intake line 80 leads to the intake side of return pump 66. Intake line 80 is used to feed brake fluid under pressure to return pump 66 in the event master brake cylinder 14 is not actuated, in order to achieve rapid brake-pressure build-up, even when working with cold, viscous brake fluid. The pressure is built up by a first pump (e.g., a precharging pump) 84 which is able to be driven by a separate electromotor 86, is connected to brake-fluid reservoir 28 of master brake cylinder 14 and delivers the brake fluid via a check valve 88 into main brake line 44 of a brake circuit I, with main brake line 44 being connected to first pressure chamber 38 of master brake cylinder 14. Precharging pump 84 acts with pressure upon first pressure chamber 38. In the event master brake cylinder 14 is not actuated, first pressure chamber 38 communicates via a restrictor, not shown in FIG. 1, with reservoir 28.

In master brake cylinders 14, the restrictor is formed by a central valve in rod piston 36, or a snifting bore hole, not shown in FIG. 1, in the connection of first pressure chamber 38 to reservoir 28. Thus, when master brake cylinder 14 is not actuated, precharging pump 84 conveys brake fluid in the circuit from reservoir 28 into first pressure chamber 38 and via the restrictor back into reservoir 28. Because of the restrictor, a pressure build-up takes place in first pressure chamber 38, and thus in main brake line 44. Because pressure acts upon first pressure chamber 38, pressure also acts upon second pressure chamber 42 via floating piston 40 of master brake cylinder 14, so that a pressure build-up also takes place in second brake circuit II. Given a closed switch-over valve 48 and an open (flow-through position) suction valve 82, as a result of the pressure build-up by precharging pump 84, a portion of the brake fluid delivered by precharging pump 84 flows to the intake side of return pump 66, in order to effect the rapid brake-pressure build-up by return pump 66.

Switch-over valve 48 and suction valve 82 represent a second valve configuration disposed on the intake side in the braking system. Switch-over valve 48, intake valves 54, 56, discharge valves 62, 64 and suction valve 82 of vehicle braking system are constructed as two-way solenoid valves. Similarly to electromotors 68, 86 of return pump 66 and precharging pump 84, they are controlled by controller 20.

Figure 2:
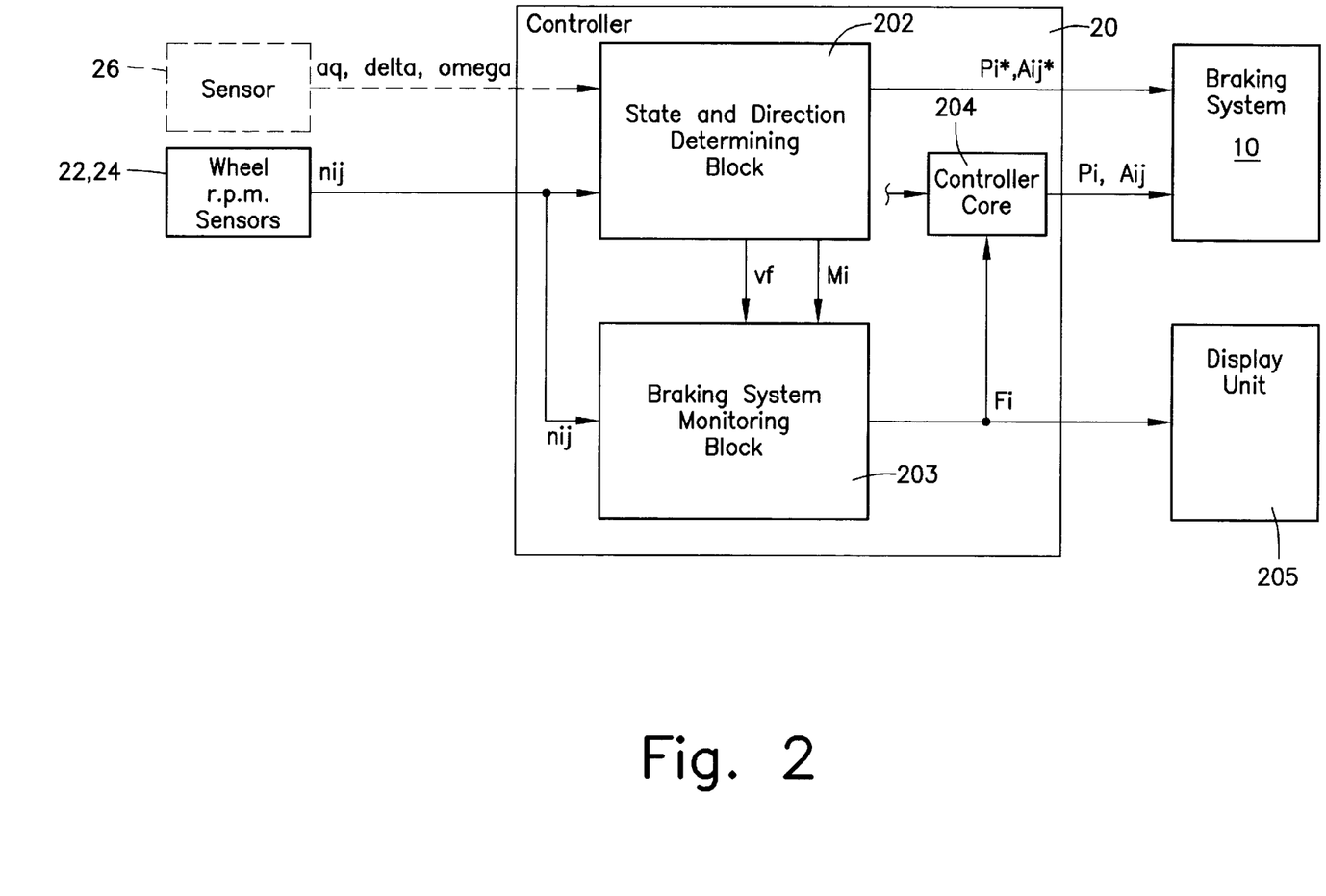
FIG. 2 shows an exemplary embodiment of a device according to the present invention for implementing the method according to the present invention.

FIG. 2 shows an exemplary embodiment of controller 20. The controller contains blocks 202, 203 and 204, which are described below. Wheel r.p.m. variables nij, produced by wheel r.p.m. sensors 22, 24, which represent the wheel r.p.m. of the corresponding wheels, are fed both to block 202 and to block 203. At this point, not all the wheel r.p.m. sensors contained in the vehicle are shown in FIG. 2. The definition of nij is provided as follows: index i indicates whether the wheel is located at the rear axle (h) or at the front axle (v). Index j indicates the allocation to the right (r) or to the left (l) vehicle side. This designation by the two indices i and j, respectively, corresponds for all variables and components for which it is used.

In block 202, it is ascertained whether the vehicle is in a predetermined state. If the vehicle is in such state, block 202 outputs driving signals Aij* and Pi* which are fed to braking system 10 to drive the individual components. Driving signals Pi* are those which drive the pumps, i.e. the precharging pump and the return pumps, contained in the braking system. Driving signals Aij* are the predefined driving signals which drive the valves of the first valve configurations, as well as the switch-over valves and the suction valves. Predefined driving signals Aij* are different, at least for the valves of the first valve configurations, depending on whether the braking system is being checked for the first or the second fault.

To determine whether the vehicle is in a predetermined state, a variable vf describing the vehicle velocity is ascertained in a conventional manner in block 202 as a function of wheel r.p.m. variables nij. With the aid of variable vf, it is determined whether the vehicle velocity is nearly constant. For example, the change of variable vf over time is determined and is compared to a corresponding threshold value. It is simultaneously ascertained in block 202 whether the vehicle is traveling approximately straight. To detect this straight-line travel, there are various possibilities as a function of the slip control carried out by block 204, which represents the controller core. For example, the difference between the wheel r.p.m. variables of wheels having the same axle is determined, in particular the front wheels. To determine whether the vehicle is traveling straight, the difference is compared to a corresponding threshold value. However, in this case, an additional logic is necessary for monitoring the wheel r.p.m. sensors, in order to detect or rule out possible errors which can originate from the wheel r.p.m. sensors. This detection of straight-line travel presents itself primarily when a brakeslip and/or traction control is being carried out in the controller core. Alternatively, and above all when an operating-dynamics control is being carried out by the controller core, and thus the relevant sensor 26 is available, a steering-angle signal delta and/or a transversal-acceleration signal aq and/or a yaw-rate signal omega can be evaluated to ascertain the straight-line travel. This is shown in FIG. 2 by the dotted-line representation and link of block 26 to block 202. A predetermined vehicle state exists when the vehicle velocity is nearly constant, and the vehicle is traveling approximately straight ahead. It can also be required that the master brake cylinder not be actuated.

Figure 3:
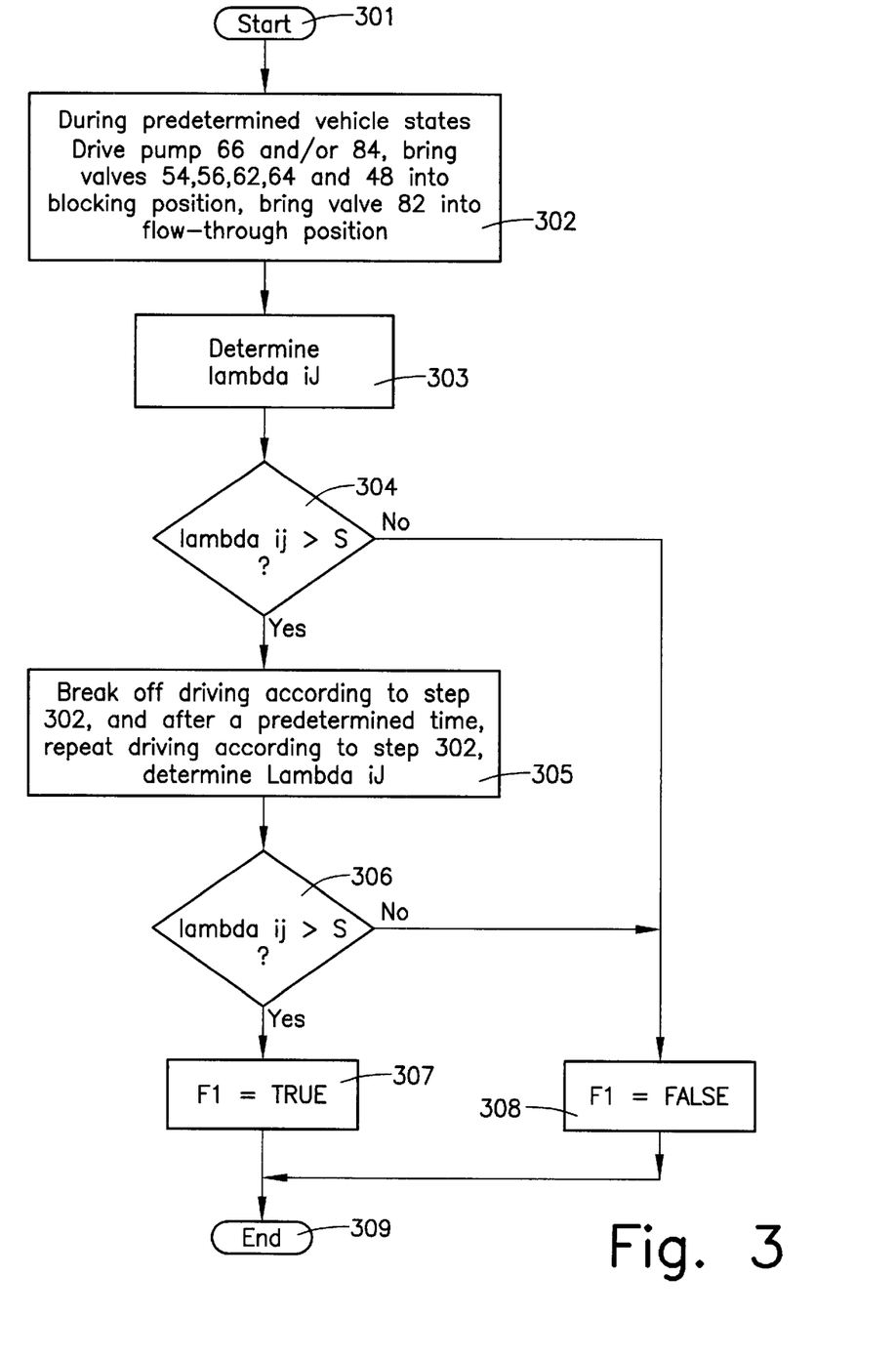
FIG. 3 shows a first exemplary flow chart for implementing the method according to the present invention in which the vehicle braking system is monitored for a first fault.
Figure 4:
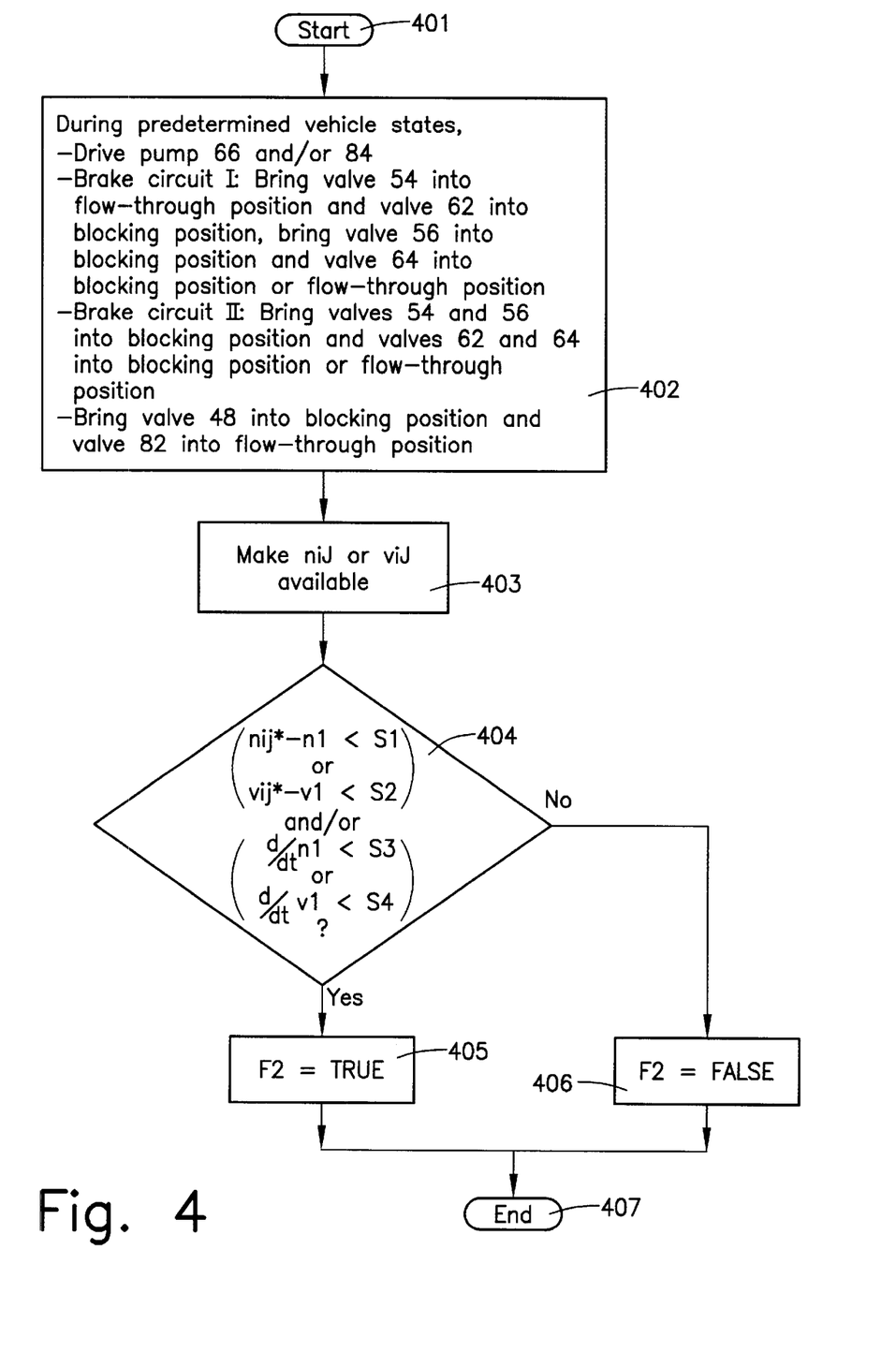
FIG. 4 shows a second exemplary flow chart for implementing the method according to the present invention in which the braking system is monitored for a second fault.

The actual monitoring of the braking system for the first and/or second fault takes place in block 203. For this purpose, wheel r.p.m. variables nij and, besides variable vf, variable Mi also emanating from block 202, are fed to block 203. Variable Mi informs block 203 whether the braking system is to be checked for the first or the second fault. The specific procedure during the check test is discussed in detail below as shown in FIGS. 3 and 4, respectively. Using variable Fi, block 203 outputs whether the first or the second fault is present. Variable Fi is fed both to a block 204 and to a block 205.

Block 204 is the controller core, by which the actual slip control, which is implemented in the controller, is carried out, as described in International Patent Publication No. WO 97/21570, German Patent Application No. 196 39 560, or the publication "FDR—Die Fahydynamikregelung von Bosch". The implemented slip control should be, for example, a brake-slip and/or a traction control, or an operating-dynamics control. To carry out the slip control, various variables are fed to controller core 204, which is indicated by the broken-off feeding arrow. An appropriate driving of the valves and pumps contained in braking system 10 is necessary to implement the slip control. For this purpose, signals Aij and Pi, respectively, emanating from controller core 204, are fed to braking system 10. As a function of signals Fi fed to the controller core, an operation under emergency conditions can be initiated in the controller core in response to the presence of a fault, or else the slip control can be interrupted.

Block 205 is a display unit which, on the basis of signals Fi, indicates whether the first and/or the second fault exists. Display unit 205 can be permanently installed in the vehicle. Alternatively, it can also be an external display unit which, for example, is connected in suitable manner to the controller during a check test of the braking system at the end of the assembly line or while at a service station.

FIG. 3 shows an exemplary flow chart implementing the method according to the present invention for monitoring the braking system for the first fault. This check begins with a step 301, followed by a step 302. In step 302, pump 66 and/or pump 84 is driven. At the same time, valves 54, 56, 62, 64 and 48 are brought into a blocking position, and valve 82 is brought into a flow-through position. In the normal case, this driving is carried out simultaneously both for the first and for the second brake circuit. However, it is also conceivable to implement this driving for only one brake circuit. It is assumed for the above-described driving, that the vehicle is in a predetermined state. It is also assumed that this driving will last until it is either actively broken off, e.g. because of a driver braking command, or the check test is concluded by step 309.

Subsequently to step 302, a step 303 is carried out. In this step, wheel-slip variables lambdaij are ascertained in known manner for the vehicle wheels, on the basis of wheel r.p.m. variables nij and variable vf. Following step 303, a step 304 is executed, in which wheel-slip variables lambdaij are compared to a threshold value S. If it is determined in step 304 that one of wheel-slip variables lambdaij is greater than threshold value S, which is synonymous with an intake valve being defectively open, then, subsequently to step 304, a step 305 is carried out. If, on the other hand, it is determined in step 304 that no wheel-slip variable is greater than the threshold value, which is synonymous with all the intake valves being perfect, then, subsequently to step 304, a step 308 is executed. Therefore, in step 308, the value FALSE is assigned to variable F1. Following step 308 is a step 309, which terminates the check test for the first fault.

In step 305, first the driving initiated in step 302 is broken off. After a predefined period of time, pump 66 and/or pump 84, as well as valves 48, 54, 56, 62, 64 and 82 are driven once more in accordance with step 302. In addition, wheel-slip variables lambdaij are ascertained once again. Subsequently to step 305, a step 306 is carried out. In this step, wheel-slip variables lambdaij are compared once again to a corresponding threshold value, as has already taken place in step 304. If it is determined in step 306 that one of wheel-slip variables lambdaij is greater than threshold value S, then subsequently to step 304, a step 307 is executed. Since at least one of the intake valves is defective, in this step, the value TRUE is assigned to variable F1. Following step 307, step 309 is carried out. If, on the other hand, it is determined in step 306 that no wheel-slip variable is greater than the threshold value, then subsequently to step 306, step 308 is executed.

As discussed above, to increase the rigidity or reliability, in steps 302 and 305, respectively, the relevant components are driven twice, staggered over time. A single driving may also be sufficient to check for the first fault, i.e., it would be possible to dispense with the second driving. To that end, appropriate changes would be necessary in the flow chart shown in FIG. 3.

FIG. 4 shows an exemplary flow chart implementing the method according to the present invention for monitoring the braking system for the second fault. At this point, the following should be stressed: The representation in FIG. 4 is limited to the fact that for one wheel, e.g., for the wheel of brake circuit I to which intake valve 54 is allocated, the associated intake valve is open. The appropriate driving for the remaining wheels of the vehicle is not shown in FIG. 4. This is not intended to represent any restriction of the method according to the present invention. As already previously mentioned, the procedure in checking for the second fault is cyclical, i.e., the intake valve is brought into its flow-through position for each wheel, one after the other, while the intake valves of the remaining wheels are in their blocking position. Therefore, the flow chart shown in FIG. 4 is carried out four times altogether, one time in corresponding manner for each wheel.

The check test begins with a step 401, followed by a step 402. In executing step 402, it is assumed that the vehicle is in a predetermined state. In step 402, pump 66 and/or pump 84 is driven. In brake circuit I, valve 54 is brought into the flow-through position, and valve 62 is brought into blocking position. At the same time, valve 56 is brought into blocking position, and valve 64 is brought into blocking or into flow-through position. In brake circuit II, valves 54 and 56 are brought into blocking position, and valves 62 and 64 are brought into blocking or into flow-through position. In both brake circuits, valve 48 is brought into blocking position and valve 82 is brought into flow-through position. Subsequently to step 402, step 403 is executed. In this step, wheel-velocity variables nij or vij are made available. Variables nij correspond to the wheel r.p.m. detected by the wheel r.p.m. sensors. Variables vij correspond to the velocities of the wheels, particularly the circumferential velocities of the wheels, and are determined in a conventional manner from the wheel r.p.m. Following step 403, step 404 is carried out.

In step 404, it is checked whether a significant r.p.m. difference and velocity difference, respectively, of the braked vehicle wheel is yielded with respect to the unbraked vehicle wheels, and/or whether the r.p.m. or velocity change is significantly high per unit of time of the braked vehicle wheel. In the first case, the deviation of wheel r.p.m. nl of the braked wheel from wheel r.p.m. nij* of an unbraked wheel is determined and is compared to a corresponding threshold value S1, or the deviation of velocity vi of the braked wheel from the velocity vij* of an unbraked wheel is determined and compared to a corresponding threshold value S2. In this connection, the way of writing nij* and vij*, respectively, is intended to indicate that they are the wheel-performance variables of the unbraked wheels. In the second case, the change over time d/dt(nl) of the wheel r.p.m. nl of the braked wheel is determined and compared to a corresponding threshold value S3, or the change over time d/dt(vi) of the velocity vi of the braked wheel is determined and compared to a corresponding threshold value S4. Alternatively, it can also be checked whether the change over time of the wheel-performance variable of the braked wheel is significantly greater than that of an unbraked wheel. If the query carried out in step 404 is fulfilled (e.g., satisfied), which is synonymous with a wheel brake cylinder being incorrectly connected to the hydraulic modulator, or a wheel r.p.m. sensor being incorrectly connected to the controller, then a step 405 is subsequently executed, in which, therefore, the value TRUE is assigned to variable F2. If, on the other hand, the query carried out in step 404 is not fulfilled, then subsequently to step 404, a step 406 is executed, in which the value FALSE is assigned to variable F2. Both following step 405 and following step 406, a step 407 is carried out, by which the check test is terminated.

For reasons of reliability and rigidity, the method according to the present invention is automatically broken off and must be restarted if brake pedal 30 is actuated during the testing cycle.

What is claimed is:

1. A method for monitoring a braking system disposed in a vehicle, the braking system including at least one brake circuit, the at least one brake circuit having an output side and including valve configurations on the output side, the vehicle including wheel brake cylinders allocated to the at least one brake circuit and connected to the valve configurations, the braking system further including at least one pump for delivering a braking medium to at least two cylinders of the wheel brake cylinders, the method comprising the steps of:

(a) during predetermined vehicle states, actuating the at least one pump, and driving the valve configurations using predetermined driving signals;

(b) determining a wheel-performance variable for at least one wheel of the vehicle during step (a), the wheel-performance variable indicating a wheel performance of the at least one wheel; and (c) checking, as a function of the wheel-performance variable, whether a first fault of the braking system has occurred and whether a second fault of the braking system has occurred, wherein, during a check for the first fault, the wheel-performance variable is a wheel-slippage variable which indicates a wheel slippage of the at least one wheel, and wherein, during a check for the second fault, the wheel-performance variable is a wheel-velocity variable which indicates one of a wheel revolutions-per-minute (r.p.m.) and a velocity of the at least one wheel.

2. The method according to claim 1,
wherein the braking system includes a reservoir for accommodating the braking medium, and
wherein the at least one pump includes a particular pump which is connected to the valve configurations, the particular pump providing the braking medium into or out of the wheel brake cylinders.

3. The method according to claim 1, wherein, during a check for the first fault, the wheel-performance variable is a wheel-slippage variable which indicates a wheel slippage of at the at least one wheel.

4. The method according to claim 1, wherein, during a check for the second fault, the wheel-performance variable is a wheel-velocity variable which indicates one of a wheel revolutions-per-minute (r.p.m.) and a velocity of the at least one wheel.

5. The method according to claim 1, wherein the wheel performance includes a wheel-rotation performance of the at least one wheel.

6. The method according to claim 1,
wherein the braking system includes a reservoir for accommodating the braking medium, and
wherein the at least one pump includes a particular pump which is directly connected, on an intake side of the braking system, to the reservoir for delivering the braking medium in a direction of the wheel brake cylinders.

7. The method according to claim 6, wherein the particular pump includes a precharging pump.

8. The method according to claim 6, wherein the at least one pump includes a second pump which is connected to the valve configurations, the second pump providing t he braking medium into or out of the wheel brake cylinders.

9. The method according to claim 8, wherein the further pump includes a return pump.

10. A method for monitoring a braking system disposed in a vehicle, the braking system including at least one brake circuit, the at least one brake circuit having an output side and including valve configurations on the output side, the vehicle including wheel brake cylinders allocated to the at least one brake circuit and connected to the valve configurations, the braking system further including at least one pump for delivering a braking medium to at least two cylinders of the wheel brake cylinders, the method comprising the steps of:

(a) during predetermined vehicle states, actuating the at least one pump, and driving the valve configurations using predetermined driving signals;

(b) determining a wheel-performance variable for at least one wheel of the vehicle during step (a), the wheel-performance variable indicating a wheel performance of the at least one wheel; and (c) checking, as a function of the wheel-performance variable, whether at least one of a first fault and a second fault of the braking system has occurred;
wherein, during a check for the first fault, the wheel-performance variable is a wheel-slippage variable which indicates a wheel slippage of the at least one wheel;
wherein, during a check for the second fault, the wheel-performance variable is a wheel-velocity variable which indicates one of a wheel revolutions-per-minute (r.p.m.) and a velocity of the at least one wheel; and wherein each of the valve configurations includes a corresponding first valve and a corresponding second valve, and further comprising the steps of:

(k) driving at least one of the corresponding first valve and the corresponding second valve using the predetermined driving signals; and (l) during a check for the second fault:
for a first valve arrangement of the valve configurations, bringing the corresponding first valve into a flow-through position and the corresponding second valve into a blocking position,
for at least one second valve arrangement of the valve configurations, bringing the corresponding first valve into the blocking position, and bringing the corresponding second valve into one of the blocking position or the flow-through position using the predetermined driving signals,
wherein the check for the second fault is performed by sequentially bringing a further first valve into the flow-through position for each of at least one further wheel of the vehicle.

11. The method according to claim 10, wherein the first valve includes an intake valve.

12. The method according to claim 10, wherein the second valve includes a discharge valve.

13. The method according to claim 10, further comprising the steps of:

(m) during step (k), determining the wheel-performance variable for each of the at least one wheel and the at least one further wheel;

(n) comparing a first variable of the wheel-performance variables for a first corresponding wheel to a second variable of the wheel-performance variables for at least one second corresponding wheel, the first corresponding wheel cooperating with at least one of the corresponding first valve and the further first valve which has been brought into the flow-through position, the second corresponding wheel cooperating with the first valve which has been brought into the blocking position; and (o) determining that the second fault is present when the first variable is brought into the flow-through position substantially corresponds, within a predetermined range, to the second variable.

14. The method according to claim 13, further comprising the steps of:

(p) determining a change of the first variable as a function of time;

(q) comparing the change to a predetermined threshold value; and (r) determining that the second fault is present when the change is less than the predetermined threshold value.

15. The method according to claim 10, further comprising the steps of:

(s) during step (k), determining the wheel-performance variable for each of the at least one wheel and the at least one further wheel;

(t) determining a change of the first variable of the wheel-performance variables for a first corresponding wheel as a function of time, the first corresponding wheel cooperating with at least one of the corresponding first valve and the corresponding further valve which is brought into the flowthrough position;

(u) comparing the change to a predetermined threshold value; and (v) determining that the second fault is present when the change is less than the predetermined threshold value.

16. A method for monitoring a braking system disposed in a vehicle, the braking system including at least one brake circuit, the at least one brake circuit having an output side and including valve configurations on the output side, the vehicle including wheel brake cylinders allocated to the at least one brake circuit and connected to the valve configurations, the braking system further including at least one pump for delivering a braking medium to at least two cylinders of the wheel brake cylinders, the method comprising the steps of:
- (a) during predetermined vehicle states, actuating the at least one pump, and driving the valve configurations using predetermined driving signals;
- (b) determining a wheel-performance variable for at least one wheel of the vehicle during step (a), the wheel-performance variable indicating a wheel performance of the at least one wheel; and
- (c) checking, as a function of the wheel-performance variable, whether at least one of a first fault and a second fault of the braking system has occurred;
  - wherein, during a check for the first fault, the wheel-performance variable is a wheel-slippage variable which indicates a wheel slippage of the at least one wheel;
  - wherein, during a check for the second fault, the wheel-performance variable is a wheel-velocity variable which indicates one of a wheel revolutions-per-minute (r.p.m.) and a velocity of the at least one wheel; and
  - wherein the braking system includes a reservoir for accommodating the braking medium and has an incoming side, the braking system further including a first valve and a second valve at the incoming side, the reservoir being connected to the first and second valves, and further comprising the step of:
- (w) during step (a), bringing the first valve into a blocking position, and the second valve into a flow-through position.

17. The method according to claim 16, wherein the first valve includes a switch-over valve.

18. The method according to claim 16, wherein the second valve includes a suction valve.

19. A method for monitoring a braking system disposed in a vehicle, the braking system including at least one brake circuit, the at least one brake circuit having an output side and including valve configurations on the output side,.the vehicle including wheel brake cylinders allocated to the at least one brake circuit and connected to the valve configurations, the braking system further including at least one pump for delivering a braking medium to at least two cylinders of the wheel brake cylinders, the method comprising the steps of:
- (a) during predetermined vehicle states, actuating the at least one pump, and driving the valve configurations using predetermined driving signals;
- (b) determining a wheel-performance variable for at least one wheel of the vehicle during step (a), the wheel-performance variable indicating a wheel performance of the at least one wheel; and
- (c) checking, as a function of the wheel-performance variable, whether at least one of a first fault and a second fault of the braking system has occurred;
  - wherein, during a check for the first fault, the wheel-performance variable is a wheel-slippage variable which indicates a wheel slippage of the at least one wheel;
  - wherein, during a check for the second fault, the wheel-performance variable is a wheel-velocity variable which indicates one of a wheel revolutions-per-minute (r.p.m.) and a velocity of the at least one wheel; and
  - wherein, during step (c), the predetermined vehicle states are present when the vehicle is traveling in an approximately straight path and when a velocity variable indicating a velocity of the vehicle is substantially constant.

20. A method for monitoring a braking system disposed in a vehicle, the braking system including at least one brake circuit, the at least one brake circuit having an output side and including valve configurations on the output side, the vehicle including wheel brake cylinders allocated to the at least one brake circuit and connected to the valve configurations, the braking system further including at least one pump for delivering a braking medium to at least two cylinders of the wheel brake cylinders, the method comprising the steps of:
- (a) during predetermined vehicle states, actuating the at least one pump, and driving the valve configurations using predetermined driving signals;
- (b) determining a wheel-performance variable for at least one wheel of the vehicle during step (a), the wheel-performance variable indicating a wheel performance of the at least one wheel; and
- (c) checking, as a function of the wheel-performance variable, whether at least one of a first fault and a second fault of the braking system has occurred;
  - wherein, during a check for the first fault, the wheel-performance variable is a wheel-slippage variable which indicates a wheel slippage of the at least one wheel;
  - wherein, during a check for the second fault, the wheel-performance variable is a wheel-velocity variable which indicates one of a wheel revolutions-per-minute (r.p.m.) and a velocity of the at least one wheel; and
  - wherein each of the valve configurations includes a first valve and a second valve, and further comprising the steps of:
- (d) driving at least one of the first valve and the second valve using the predetermined driving signals; and
- (e) during a check for the first fault, bringing the first and second valves into a blocking position using the predetermined driving signals.

21. The method according to claim 20, wherein the first valve includes an intake valve.

22. The method according to claim 20, wherein the second valve includes a discharge valve.

23. The method according to claim 20, wherein the vehicle includes a plurality of wheels, and further comprising the steps of:
- (f) during step (d), determining the wheel-performance variable for each corresponding wheel of the wheels;
- (g) comparing the wheel-performance variables to a predetermined threshold value;
- (h) if at least one variable of the wheel-performance variables is greater than the predetermined threshold value, deactuating the at least one pump and stopping the first and second valves from being driven; and
- (i) after a predetermined time period, re-actuating the at least one pump and further driving the first and second valves using the predetermined driving signals, (j) if, after step (i), the at least one of the wheel-performance variables is greater than the predetermined threshold value, establishing that the first fault is present.

24. A device for monitoring a braking system disposed in a vehicle, the braking system including at least one brake circuit, the at least one brake circuit having an output side and including valve configurations on the output side, the valve configurations including a switch-over valve and a one-way check valve connected in parallel to the switch-over valve, the vehicle including wheel brake cylinders which cooperate with the brake circuit and which are connected to the valve configurations, the braking system further including at least one pump for providing a braking medium to at least two cylinders of the wheel brake cylinders, the device comprising:

a first arrangement, during predetermined vehicle states, actuating the at least one pump and driving the valve configurations using predetermined driving signals; and a second arrangement determining a wheel-performance variable for at least one wheel of the vehicle when the at least one pump is actuated and the valve configurations are driven, the wheel-performance variable indicating a wheel performance of the at least one wheel, the second arrangement checking, as a function of the wheel-performance variable, the braking system to determine whether a first fault has occurred and whether a second fault has occurred.

25. The device according to claim 24, wherein the wheel performance includes a wheel-rotation performance of the at least one wheel.

* * * * *